United States Patent [19]

Jaffray et al.

[11] Patent Number: 5,325,200
[45] Date of Patent: Jun. 28, 1994

[54] APPARATUS AND METHOD FOR TRANSFORMING A DIGITIZED SIGNAL OF AN IMAGE INTO A REFLECTIVE SURFACE

[75] Inventors: Ian Jaffray, Toronto; John F. Bronskill, Scarborough, both of Canada

[73] Assignee: Imageware Research and Development Inc., Toronto, Canada

[21] Appl. No.: 787,207

[22] Filed: Nov. 4, 1991

Related U.S. Application Data

[62] Division of Ser. No. 387,049, Jul. 31, 1989, Pat. No. 5,063,448.

[51] Int. Cl.$^5$ ............................................. H04N 5/22
[52] U.S. Cl. ....................................................... 348/586
[58] Field of Search .................................... 358/22, 160; H04N 9/535, 5/22

[56] References Cited

U.S. PATENT DOCUMENTS 5,124,784  6/1992  Takahashi et al. ................... 358/22

FOREIGN PATENT DOCUMENTS 0216536A  4/1987  European Pat. Off. .
3620261A  12/1987  Fed. Rep. of Germany .
2170373A  12/1985  United Kingdom .......... H04N 1/40

OTHER PUBLICATIONS

Edge Detection and the Laplacian Operator from "Digital Picture Processing", A. Rosenfeld and A. Kak, vol. 2, Academic Press, 1982, Thresholding Techniques, vol. 2, Contrast Modification, vol. 1, Median and Rank Value Filtering, vol. 1, Mean Filtering, vol. 1, Definition of Convolution, vol. 1.
Definition and Discussion of Morphological Edge Detectors from "Image Analysis and Mathematical Morphology", J. Serra, Academic Press, 1983, Definition of Opening, Closing, Definition of Erosion, Ditation.
Contrast Modification Techniques from "Digital Image Processing", W. K. Pratt, John Wiley and Sons, 1978, Median Filtering.
Proceedings of the Seventeenth Annual Allerton Conference on Communication, Control, and Computing, Oct. 10–12, 1979, Allerton House, Monticello, Illinois, V. K. Aatre et al.: "Median filtering", pp. 886–895, see the whole article.
1987 IEEE Int. symposium on Circuits and Systems, vol. 1 of 3, May 4–7, 1987, Philadelphia, Pa., IEEE, J.-H Lee et al.: "A fast algorithm for two-dimensional Wilcoxon filtering", pp. 268–271, see the introduction.

*Primary Examiner*—James J. Groody
*Assistant Examiner*—David E. Harvey
*Attorney, Agent, or Firm*—Bereskin and Parr

[57] ABSTRACT

The apparatus and method employ a variety of units, including Laplacian filters, rank value filters, edge detectors, gain units and summation units, to transform an input digitized signal of an image, the transformation being carried out for each pixel independently. The various elements are combined to produce a variety of desired visual effects, e.g. a brush stroke effect, or the appearance of a reflective chrome surface. Further, an apparatus is provided in which a conditioning unit generates a conditioning function, which enables different parts of an image to be combined in accordance with different methods. Thus, a foreground of an image could have the edge content reinforced, whilst the background has brush stroke texture added.

6 Claims, 1 Drawing Sheet

APPARATUS AND METHOD FOR TRANSFORMING A DIGITIZED SIGNAL OF AN IMAGE INTO A REFLECTIVE SURFACE

CROSS REFERENCE TO RELATED APPLICATION

This application is a division of application Ser. No. 07/387,049 filed Jul. 31, 1989, (now U.S. Pat. No. 5,063,448) the contents of which are hereby incorporated by reference.

FIELD OF THE INVENTION

This invention relates to both a method and an apparatus for transforming pictures or images. More particularly, it relates to a method or apparatus for effecting a transformation of a digitized signal of an image into a reflective surface.

BACKGROUND OF THE INVENTION

Both colour and black and white photography are in widespread use for both still and moving pictures. In the television field at least, numerous techniques have been used for manipulating a television picture in various ways, e.g. by adding or inserting a second image into a window in a first image. However, the basic picture itself remains essentially unchanged.

There is also a known technique of "posterisation" which essentially reduces the image to individual areas of solid, uniform colour, rather than progressive changes in colour.

If one wants to achieve a hand drawn or painted appearance, then the principal current way of achieve this is to simply have a skilled artist draw or paint his perception of the subject in a chosen style, using conventional instruments such as pen, pencil and paintbrush.

The use of an artist is acceptable in some circumstances, and indeed it is almost certain that a human artist can always add some effect or detail that can never be achieved by a machine. Nonetheless, for many subjects, the use of an artist is either prohibitively expensive or unnecessarily time consuming. In particular, if one wishes to add such an effect to a television signal, then one has the problem of applying the effect to every frame of the signal, where there are thirty frames per second. Clearly, for even a very short sequence, the amount of work involved would be prohibitive.

Accordingly, it is desirable to provide a technique which enables a conventional colour or black and white image to be processed to achieve a variety of effects, principally giving an image a hand-drawn or painted appearance. Other more specialized effects can be provided, for example, an image can be rendered so that it appears to be a three-dimensional chrome surface. Ideally, one requires a method and apparatus that enables a variety of different techniques to be selected, manipulated and combined with one another to achieve an almost infinite variety of effects. It is further desirable that such an effect should be capable of being applied relatively quickly and economically to a digitized television or motion picture signal, or a digitized still picture or photograph.

SUMMARY OF THE PRESENT INVENTION

The present invention provides an apparatus and method, capable of imparting a reflective appearance to a digitized signal of an image. Thus, the present invention provides an apparatus for transforming an input digitized signal of an image comprising a plurality of pixels to give the appearance of a reflective chrome surface, the apparatus comprising: an input for an original digitized signal of an input image; an input for a reflected digitized signal of an image to be reflected in the input image; means for generating smoothness constants for the two coordinates of the pixels representative of the surface smoothness; means for generating image extent constants representative of the image extent of the pixels in the two coordinate directions; means for checking, for each coordinate of each pixel, whether a first intensity, being the intensity of the respective pixel of the input image, is the same as the second intensity of another pixel of the input image spaced along the respective coordinate by the respective coordinate smoothness constant; setting means for setting, for each coordinate of each pixel, the respective coordinate equal to the coordinate of the input image when said checking means determines that the first and second intensities are the same, and otherwise, for setting the coordinate equal to the coordinate image extent constant divided by $\pi$ and multiplied by the arc tangent of the respective coordinate smoothness constant divided by the difference between the first intensity minus the second intensity; and means for determining, for each pixel, the intensity in a transformed output image by taking the intensity of a corresponding pixel in the reflected digitized signal determined by the coordinates set by said setting means. A corresponding method is also provided.

BRIEF DESCRIPTION OF THE DRAWINGS

For a better understanding of the present invention and to show more clearly how it may be carried into effect, reference will now be made, by way of example, to the accompanying drawing in which.

DESCRIPTION OF THE PREFERRED EMBODIMENTS

Figure 1:
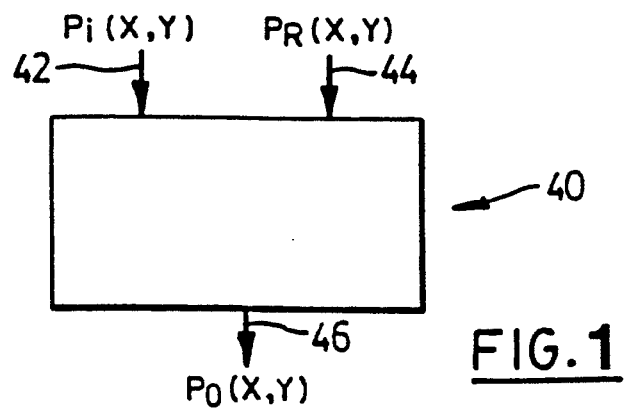
FIG. 1 shows schematically an apparatus in accordance with the present invention.

Before describing the individual techniques in detail, a description of individual elements or processes is provided. In the following discussion, the assumption is made that the image is a digital image. In the case of an image which is initially in analog form, this would need to be processed to digitize it. Further, for the digitized image, this is considered to comprise a number of pixels or individual points, which can be processed individually, as is known.

The notion used to identify the individual pixels in an image is to use an x-y coordinate system, x being the horizontal coordinate and y the vertical coordinate. Then, each pixel is denoted by P(x,y), where x and y are the coordinates for that particular pixel. P denotes the intensity of the pixel. Clearly, for each pixel, in a colour image, there will be hue and saturation parameters as well.

There are a number of basic processes transformations that can be applied to the image. Thus, two images can be subjected to the basic arithmetic functions of addition, subtraction, multiplication or division, this being done on a pixel by pixel basis; e.g., each pixel of one image is added, subtracted etc. to the corresponding pixel of the second image, to produce a corresponding pixel in the final or output image. For example, one can simply add two images together as, by the equation $P_3(x,y) = P_1(x,y) + P_2(x,y)$ for all x,y.

A further technique is to simply multiply the intensity of each pixel by a constant gain, denoted G. Again, this is presented by an equation:

$$P_2(x,y) = GP_1(x,y) \text{ for all } x, y.$$

One conventional use of applying a gain to the pixels is to compensate for an image which has a predominance of low intensity pixels, i.e. the image has an overall dark appearance. If one draws a histogram of the frequency of occurrence against intensity, one gains an impression of the overall impression of the picture. If all the pixels are clustered towards the left hand end of the scale, i.e. indicating uniformly low intensity, then one can apply a certain gain to all the pixels to expand the range of intensity or grade levels to cover the entire range. Similarly, an excessively bright image will show a histogram with all the pixels clustered towards the upper end of the grade level or intensity scale. This can simply be modified by applying a gain which is less than unity, to reduce the value of the intensity.

Image filtering is another standard technique which is employed by the present invention in combination with other standard techniques.

A mean filter or blur replaces the intensity of each pixel by an intensity derived by averaging or taking arithmetic mean value of the intensity of that pixel and its neighbours. This operation is repeated for each pixel in the image. The larger the area or number of pixels involved in the averaging process, the greater the blurring effect. This is sometimes referred to as a moving window average, since one is effectively looking at all the pixels within a certain window centred on a particular pixel.

By way of example, a 3×3 window blur would take the values of nine pixels in a square and then use this average value as the intensity for the centre pixel of that window.

For pixels at the edge of an image, as they are not totally surrounded by other pixels, allowance has to be made for this.

There is also known in the art a large variety of standard filters. These filters and other techniques mentioned above have conventionally been used to enhance pictures suffering from noise or distortion. Alternatively, in the field of robotics and industrial applications, image processing has been used with a view to aiding machine or automatic recognition of objects against a background.

In the present invention, rather than trying to eliminate distortion or noise, the inventors have realized that a variety of interesting and visually pleasing effects can be achieved by, in effect, deliberately introducing controlled distortion. This gives a desired visual effect in the final image.

It should be appreciated that, for a typical video resolution image, there are 500 rows and 500 columns of pixels, giving 250,000 pixels. To take a nine-point arithmetic means for each pixel and compute in 1/30 second, this being the time for each frame, is beyond the ability of current general purpose computers. In other words, it is not possible to carry this out in real time without special purpose apparatus.

Another type of image transformation is one that re-maps the locations of pixels in an image. An example of this would be to rotate an image through a given angle. The present invention uses several novel geometrical image manipulations which are called perturbation effects, since location of a pixel is perturbed in some manner. It has been realized that, by using shape from shading theory, one can turn an image into a reflective or refractive surface. In effect this technique is used to model the image intensities as a three-dimensional surface.

These effects can be achieved either in a software form or in real-time hardware. It is believed that at the present time there is hardware available that would enable circuit cards to be constructed incorporating image processing ASICS, to effect the methods of the present invention. These circuit cards would be controlled from various industry standard computer buses.

Reference will now be made to FIG. 1 which shows an example of the techniques and methods in accordance with the present invention.

In FIG. 1, there is shown an apparatus for providing a chrome surface effect, i.e. the effect of reflecting an image in a reflective surface. Here, the apparatus is generally denoted by the reference 40. Again, the apparatus is shown as a single unit having an input 42 for an image, $P_i$, to be processed and a second input 44 for an image, $P_R$, that is to be reflected into the output image. An output is indicated at 46. The equations indicating the processing occurring in the apparatus 40 are as follows:

$$P_o(x,y) = P_R(X_T, Y_T) \text{ for all } x,y$$

Where:

$$X_T = \begin{bmatrix} x; P_i(x,y) - P_i(x-a,y) = 0 \\ \dfrac{x_m \arctan}{\pi}\left(\dfrac{a}{P_i(x,y) - P_i(x-a,y)}\right) \text{ otherwise} \end{bmatrix}$$

$$Y_T = \begin{bmatrix} y; P_i(x,y) - P_i(x, y-b) = 0 \\ \dfrac{y_m \arctan}{\pi}\left(\dfrac{b}{P_i(x,y) - P_i(x,y-b)}\right) \text{ otherwise} \end{bmatrix}$$

Where: a, b are constants setting the surface smoothness, and where $x_m$ and $y_m$ represent the maximum extent of the digitized input images in the x and y directions respectively, i.e., the number of pixels in the two directions.

In effect, the process here is reflecting the image, $P_R$, in the input image, $P_i$, and thus is treating the input image as a reflective or mirrored surface. Further, the intensity of each pixel in the input image, $P_i$ is treated as the height above an arbitrary flat surface, so as to give a three dimensional effect, two dimensions being the x and y coordinates and the third dimension being the pixel intensity.

Thus the method starts by converting the input image, $P_i$, into a three dimensional surface. It then assumes that this is reflective and effectively takes the reflection of the image, $P_R$, in this reflective surface. In order to be able to "see" the shape of a complex reflective surface, one has to have some image that is reflected in it. It is for this reason that the image $P_R$ is provided. The image $P_R$ can be any suitable image, and can be selected to give a desired appearance.

It should be appreciated that if the input image, $P_i$ is simply a flat surface, i.e. a conventional plain mirror, then one would obtain a pure reflection of the image to be reflected, $P_R$. Where the input image $P_i$ is a complex shape, e.g. a person's head, then the reflective surface is extremely complex and, resulting in considerable distortion of the image to be reflected, $P_R$, so that this is often unrecognizable. Even if the reflected image $P_R$ becomes totally distorted and unrecognizable the output image still retains the shape or appearance of the input image $P_i$, but with a simulated, reflective or chrome finish.

The equations given above effectively intend to simulate, in a simplistic way, this process. These are discussed below for the x coordinate, it being appreciated that the y coordinate is calculated in an exactly corresponding manner.

For the x coordinate when the condition $P_i(x,y)$ minus $P_i(x-a,y)=0$, one has a flat reflective surface, at least locally. Hence, a point on the image to be reflected, $P_R$ is reflected back from the flat surface to exactly the same point. For this reason, $X_T$ is simply set equal to x. However, where this condition is not met, i.e. the surface is not locally flat, consequently, the local surface of the image $P_i$ will point to an alternate location on the image to be reflected $P_R$. The arctan function is simply a calculation as to the point in the image $P_R$ that the locally inclined surface of the image $P_i$ indicates.

It is appreciated that these calculations are optically simplistic, and do not take into account the complex effects one obtains from complex curved surfaces. Nonetheless, it has been found that the overall effect is to give a very effective simulation of a chrome or reflective surface, which produces a realistic three-dimensional effect, representative of the original input image $P_i$. The input image $P_i$ then appears to have been coated with reflective or chrome finish.

Whilst a variety of different constants can be used, it has been found that a useful range for the smoothing constants a,b is 1-15, with a value of 1 creating a reflective surface that is most sensitive to the undulating surfaced of $P_i$ and the value of 15 being much less sensitive than the local variations in $P_i$.

As an example of the image that can be used for the image to be reflected, $P_R$, one can choose a ramp image represented by the formula $P_R(x,y)=y$ for all x,y. This is a ramp which increases from zero at y=0 to a maximum value for the maximum value y. It will be appreciated that the ramp can be arranged to incline in any direction. In effect, the intensity of the image to be reflected, $P_R$, varies as the shape given by the ramp. Further, one could maintain a constant input image, whilst varying $P_R$, the image to be reflected, e.g. by rotating the ramp image discussed above about an axis perpendicular to the x-y plane. One could also combine a moving or changing input image $P_i$, with a moving image $P_R$.

The result of using such an image for the image to be reflected, $P_R$, is to give a 3-D bas relief effect of the input image, $P_R$. This results because when $P_R$ is chosen as a uniformly changing ramp image, it varies from dark to light across its surface. This models a uniformly changing light source that is reflected into the reflective surface of the input image $P_i$, which tends to light the three dimensional surface model of the input image in a way that gives it a three dimensional relief image. In other words, the lighting gives depth as seen by a viewer.

Figure 2:
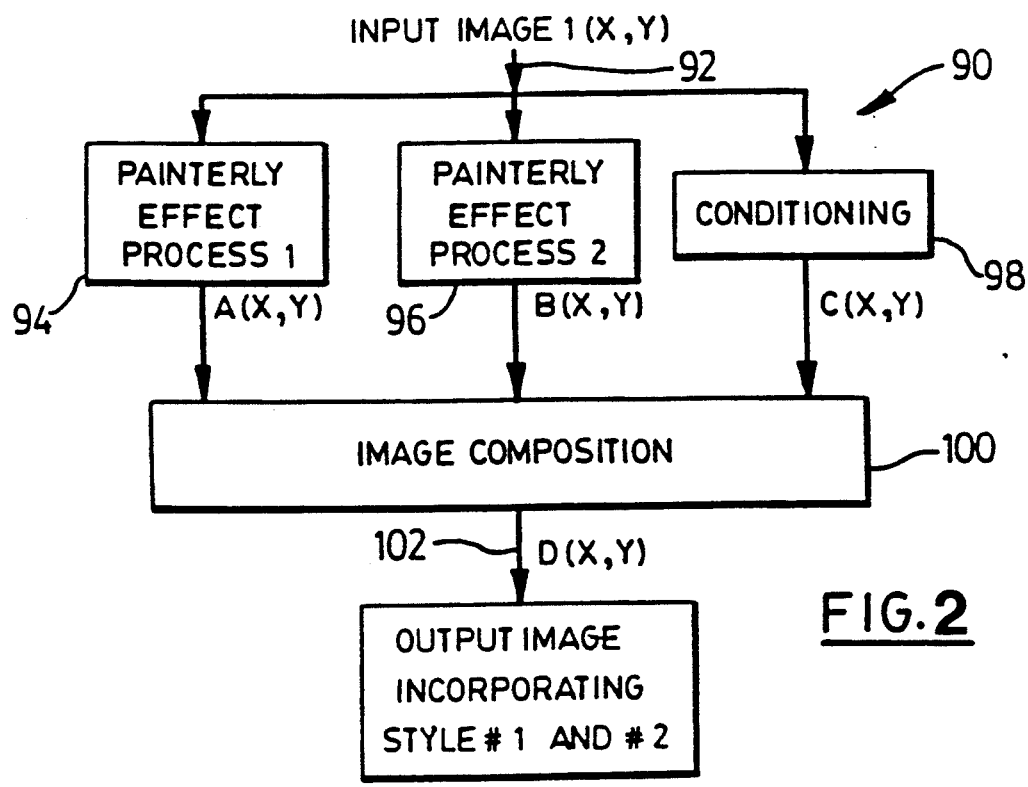
FIG. 2 shows an apparatus for combining different effects together.

Turning to FIG. 2, there is shown a method and apparatus for combining different effects together. Here, the apparatus 90 has an input 92 connected to first and second processes indicated at 94, 96 and to a conditioning unit 98. The outputs of these three units 94, 96 and 98 are connected to an image composition unit 100 which produces an output 102.

The processes 94, 96 can be any one of the processes in accordance with the present invention, e.g. those described in relation to the preceding figures. This apparatus enables them to be combined in a variety of ways. The conditioning unit 98 provides a switching function to combine the two modified images produced from the processes 94, 96 desired.

The conditioning unit 98 can produce the following function at the output 102:

$$D(x,y) = \frac{C(x,y)A(x,y) = (MAX\ VAL - C(x,y))B(x,y)}{MAX\ VAL}$$

Where: MAX VAL is the maximum allowable pixel intensity value.

In effect, this function provides that the respective weights given to the two processes A, B, depends upon the intensity of the conditioning signal, C, for that particular pixel.

It is expected that useful conditioning functions for the conditioning unit 98 are: no conditioning performed; edge magnitude detection; and contrast stretching. Other conditioning techniques are possible. Thus, one can detect different areas of an image in relation to colour and/or intensity or other factors. Then, these different areas can be subjected to different processes. Also, whilst just two processes 94, 96 are shown, it will be realized that this basic arrangement can be generalized to any number of processes.

Another possibility is to combine images dependent upon the brightness, i.e. in the bright areas one processing technique is used, whereas in the dark areas another technique is used. In this case, the input image itself may serve as the switching function. However, one may wish to condition the input image in some way to change the reaction of the switching function. For instance, an edge magnitude detector could be employed to create image C. This has the effect of having image A dominate the output image in areas of high edge intensity and image B in regions of low edge intensity. Alternatively, the input image could have its intensity profile modified in some way such as a contrast stretch in order to modify the switching function.

We claim:

1. A method for transforming an input digitized signal of an input image, comprising a plurality of pixels, to give the appearance of a reflective surface, the method comprising, in the following order, the following steps:
    (i) generating smoothness constants for the two coordinates of each pixel representative of the surface smoothness;
    (ii) generating image extent constants representative of the image extent of the pixels in the two coordinate directions;
    (iii) providing a reflected digitized signal of an image to be reflected in the surface of the input image;
    (iv) for each coordinate of each pixel, checking whether a first intensity, which is the intensity of the respective pixel in the input image, is the same as the second intensity of another pixel of the input image spaced along the respective coordinate by the respective coordinate smoothness constant;

(v) for each coordinate of each pixel, setting the coordinate equal to the coordinate of the input image when step (iv) determines that the first and second intensities are the same, and otherwise setting the coordinate of each pixel equal to the respective coordinate image extent constant divided by $\pi$ and multiplied by the arc tangent of the respective coordinate smoothness constant divided by the difference between the first intensity minus the second intensity;

(vi) determining, for each pixel, the intensity in a transformed output image by taking the intensity of a corresponding pixel in the reflected digitized signal determined by the coordinates calculated in steps (iv) and (v).

2. A method as claimed in claim 1, wherein the smoothness constant generated in step (i) are in the range 1–15.

3. A method as claimed in claim 2, wherein each smoothness constant is 1.

4. A method as claimed in claim 1 or 2, wherein the reflective digitized signal of step (iii) is a ramp signal.

5. A method as claimed in claim 4, wherein the ramp signal is represented by the formula $P_r(x,y)=y$ for all x,y.

6. A method as claimed in claim 1, in combination with one or more methods for imparting a different effect to the input image, which method includes the following additional steps:

(i) generating a conditioning signal from the input signal; and (ii) composing an output signal by selection from the outputs of the selected methods, in dependence upon the conditioning signal.

* * * * *